United States Patent
Kim et al.

(10) Patent No.: US 9,230,505 B2
(45) Date of Patent: *Jan. 5, 2016

(54) APPARATUS, SYSTEM AND METHOD FOR PROVIDING CLOCK AND DATA SIGNALING

(71) Applicant: Lattice Semiconductor Corporation, Portland, OR (US)

(72) Inventors: Daekyeung Kim, Palo Alto, CA (US); Daeyun Shim, Saratoga, CA (US); Baegin Sung, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,577

(22) Filed: Feb. 25, 2013

(65) Prior Publication Data
US 2014/0241457 A1    Aug. 28, 2014

(51) Int. Cl.
*H04L 7/02* (2006.01)
*G09G 5/00* (2006.01)
*H04L 7/00* (2006.01)
*H04L 25/49* (2006.01)

(52) U.S. Cl.
CPC .............. *G09G 5/006* (2013.01); *H04L 7/0008* (2013.01); *H04L 25/49* (2013.01); *G09G 5/008* (2013.01); *G09G 2370/12* (2013.01)

(58) Field of Classification Search
CPC ........... H04L 5/00; H04L 15/00; H04L 17/00; H04B 1/00; H04B 3/00; H04B 5/00; H04B 7/00; H04B 10/00; H04B 13/00; H04B 14/00; H04B 7/02
USPC ............ 375/219, 220, 22, 295, 316, 264, 299
See application file for complete search history.

(56) References Cited

U.S. PATENT DOCUMENTS

| | | | | |
|---|---|---|---|---|
| 3,666,890 | A * | 5/1972 | Wade | 370/206 |
| 6,205,182 | B1 * | 3/2001 | Pardini et al. | 375/260 |
| 6,463,092 | B1 | 10/2002 | Kim et al. | |
| 6,496,540 | B1 * | 12/2002 | Widmer | 375/242 |
| 6,731,751 | B1 | 5/2004 | Papadopoulos | |
| 6,832,080 | B1 | 12/2004 | Arslan et al. | |

(Continued)

FOREIGN PATENT DOCUMENTS

| | | |
|---|---|---|
| EP | 1241844 | 9/2002 |
| JP | 2004-520778 A | 7/2004 |
| WO | WO 2007/060620 A1 | 5/2007 |

OTHER PUBLICATIONS

PCT International Search Report and Written Opinion, PCT Application No. PCT/US2014/015872, Jun. 16, 2014, 13 pages.

*Primary Examiner* — Emmanuel Bayard
(74) *Attorney, Agent, or Firm* — Fenwick & West LLP

(57) ABSTRACT

Techniques and mechanisms for exchanging communications which each represent a respective combination of data and clock signaling. In an embodiment, encoder logic generates a first signal pair, including encoding a first differential data signal pair with a first clock signal of a differential clock signal pair. The encoder logic further generates a second signal pair, including encoding a second differential data signal pair with a second clock signal of the same differential clock signal pair. In another embodiment, decoder logic receives and decodes the first signal pair and the second signal pair, wherein the decoding generates the first differential data signal pair, the second differential data signal pair and a clock signal.

20 Claims, 7 Drawing Sheets

(56) References Cited

U.S. PATENT DOCUMENTS

| | | | |
|---|---|---|---|
| 6,914,597 B2 * | 7/2005 | Myers | 345/204 |
| 7,020,208 B1 * | 3/2006 | Yen | 375/244 |
| 7,085,950 B2 * | 8/2006 | Ehmann et al. | 713/503 |
| 7,154,940 B2 | 12/2006 | Scott et al. | |
| 7,339,502 B2 * | 3/2008 | Furtner | 341/55 |
| 7,358,869 B1 | 4/2008 | Chiarulli et al. | |
| 7,408,993 B2 | 8/2008 | Webster | |
| 7,490,209 B1 * | 2/2009 | Charagulla | 711/167 |
| 7,565,576 B2 * | 7/2009 | Seroff | 714/27 |
| 7,627,044 B2 | 12/2009 | Kim et al. | |
| 7,836,363 B2 * | 11/2010 | Quinlan et al. | 714/712 |
| 7,844,762 B2 | 11/2010 | Banks et al. | |
| 7,952,538 B2 * | 5/2011 | Han et al. | 345/60 |
| 8,090,030 B2 | 1/2012 | Kim et al. | |
| 8,108,576 B2 * | 1/2012 | Shen et al. | 710/72 |
| 8,176,214 B2 | 5/2012 | Jones et al. | |
| 8,416,852 B2 | 4/2013 | Matsubayashi | |
| 8,589,998 B2 * | 11/2013 | Wu et al. | 725/127 |
| 8,644,334 B2 | 2/2014 | Altmann | |
| 8,692,937 B2 | 4/2014 | Altmann | |
| 8,804,853 B2 | 8/2014 | Hsueh | |
| 2002/0044147 A1 | 4/2002 | Martin | |
| 2002/0149541 A1 | 10/2002 | Shin | |
| 2002/0184552 A1 | 12/2002 | Evoy et al. | |
| 2003/0069042 A1 | 4/2003 | Sato et al. | |
| 2003/0131310 A1 * | 7/2003 | Pitio | 714/800 |
| 2003/0145258 A1 * | 7/2003 | Warner et al. | 714/704 |
| 2003/0201802 A1 | 10/2003 | Young | |
| 2003/0208779 A1 * | 11/2003 | Green et al. | 725/143 |
| 2004/0036494 A1 * | 2/2004 | Mak et al. | 324/763 |
| 2004/0239374 A1 | 12/2004 | Hori | |
| 2004/0240580 A1 * | 12/2004 | Bessios et al. | 375/288 |
| 2005/0044257 A1 * | 2/2005 | Booth et al. | 709/232 |
| 2005/0280405 A1 | 12/2005 | Bray | |
| 2006/0044061 A1 | 3/2006 | Mukherjee et al. | |
| 2006/0114046 A1 * | 6/2006 | Mizutani | 327/291 |
| 2006/0126751 A1 * | 6/2006 | Bessios | 375/264 |
| 2007/0057830 A1 | 3/2007 | Wiesbauer et al. | |
| 2007/0146011 A1 | 6/2007 | O'Mahony et al. | |
| 2007/0200859 A1 | 8/2007 | Banks et al. | |
| 2008/0022023 A1 * | 1/2008 | Kim et al. | 710/72 |
| 2008/0037693 A1 | 2/2008 | Andrus et al. | |
| 2008/0063129 A1 | 3/2008 | Voutilainen | |
| 2008/0285634 A1 * | 11/2008 | Raghavan et al. | 375/219 |
| 2008/0310521 A1 | 12/2008 | Otsuka et al. | |
| 2008/0315920 A1 | 12/2008 | Hung et al. | |
| 2009/0168918 A1 * | 7/2009 | Chen et al. | 375/295 |
| 2009/0252206 A1 * | 10/2009 | Rheinfelder et al. | 375/219 |
| 2010/0013579 A1 | 1/2010 | Horan et al. | |
| 2010/0054738 A1 | 3/2010 | Yuki | |
| 2010/0067877 A1 | 3/2010 | Ichimura et al. | |
| 2010/0104029 A1 | 4/2010 | Lee et al. | |
| 2010/0138887 A1 * | 6/2010 | Nakata | 725/110 |
| 2010/0215118 A1 * | 8/2010 | Ware et al. | 375/295 |
| 2010/0232484 A1 | 9/2010 | Chiu | |
| 2010/0272215 A1 | 10/2010 | Lin et al. | |
| 2010/0329381 A1 * | 12/2010 | Shimizu et al. | 375/293 |
| 2011/0196997 A1 | 8/2011 | Ruberg et al. | |
| 2012/0008263 A1 | 1/2012 | Sugita | |
| 2012/0082249 A1 | 4/2012 | Hsueh | |
| 2012/0098960 A1 | 4/2012 | Fujino et al. | |
| 2012/0106949 A1 | 5/2012 | Tang et al. | |
| 2012/0155398 A1 | 6/2012 | Oyman et al. | |
| 2012/0229310 A1 | 9/2012 | Chang | |
| 2013/0015821 A1 | 1/2013 | Kim et al. | |
| 2013/0089110 A1 * | 4/2013 | Sharma et al. | 370/503 |
| 2013/0151875 A1 | 6/2013 | Huynh | |
| 2013/0223293 A1 | 8/2013 | Jones et al. | |

* cited by examiner

APPARATUS, SYSTEM AND METHOD FOR PROVIDING CLOCK AND DATA SIGNALING

BACKGROUND

1. Technical Field

The present invention relates generally to the field of data communications, and more particularly, to the transmission of combined clock and data signals.

2. Background Art

There are a variety of conventional systems and methods for transmitting data between a transmitter and a receiver. One important aspect of all communication systems is to maximize the bandwidth provided by available channels. Unfortunately, most systems include a variety of control signals that must be sent between the transmitter and the receiver to ensure proper operation, and maintain synchronization between the transmitter and the receiver.

To facilitate such synchronization, various communication methods provide for transmission of a clock signal in parallel with data signals. Most such schemes provide a single line or channel dedicated for the transmission of the clock signal and other signal lines or channels dedicated for the transmission of data. Recent techniques and mechanisms have been introduced to improve bandwidth utilization by combining a single-ended clock signal with a data signal. However, as successive generations of data communication standards continue to trend toward connectors which have fewer contacts (e.g. pins, pads, balls, sockets, etc.) and support higher frequency signaling, it is expected that the marginal improvements provided by such techniques and mechanisms will be insufficient for future communication requirements.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and or mechanisms for communicating and/or processing signals—referred to herein as combined data and clock signals, or alternatively as combined clock and data signals—which represent an encoding of data and a clock signal with one another. Certain aspects of various embodiments are discussed herein in the context of transition minimized differential signaling (TMDS). However, those skilled in the art will recognize that such discussion may be extended to additionally or alternatively apply to various other data communication contexts, according to different embodiments.

Figure 1:
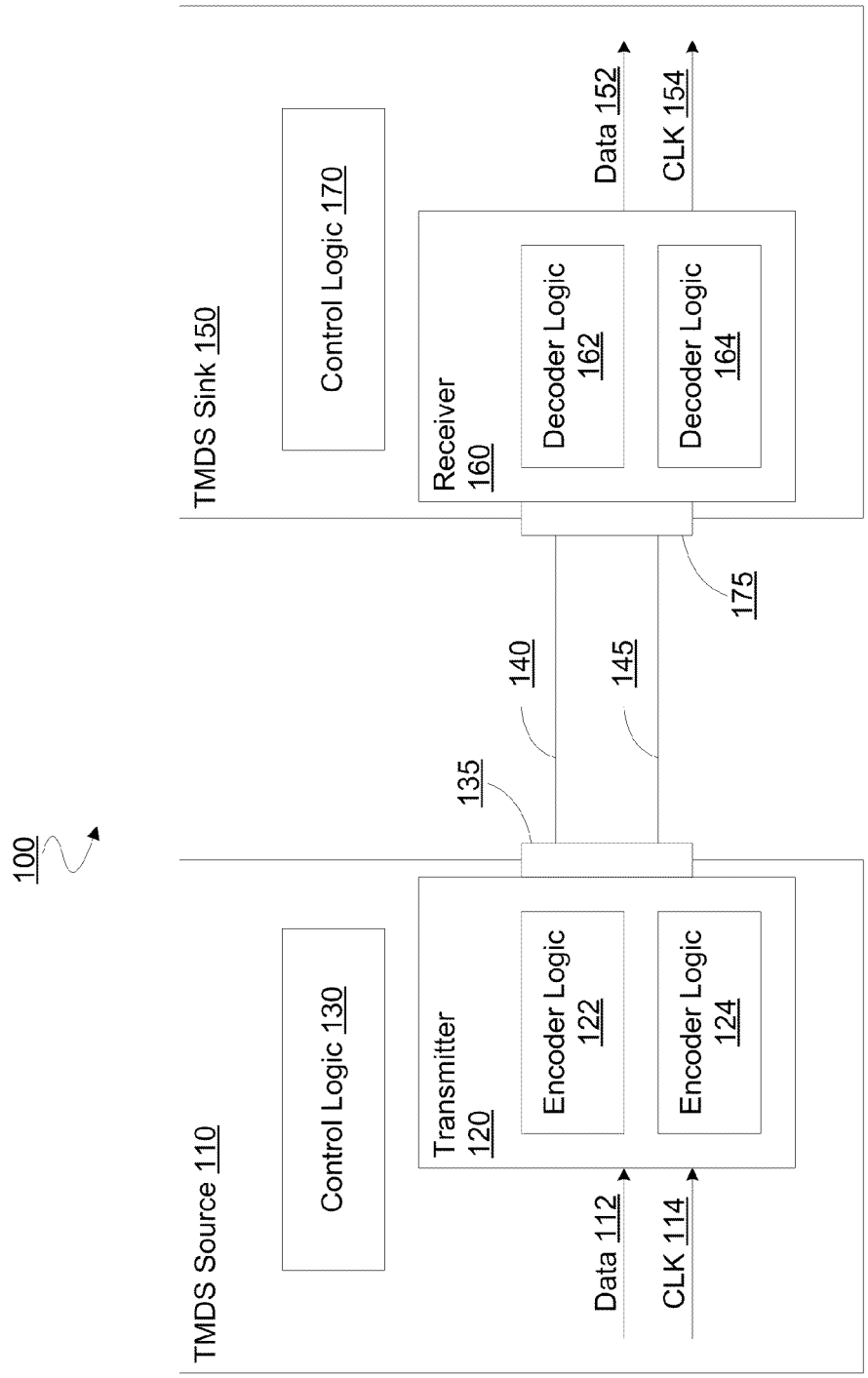
FIG. 1 is a block diagram illustrating elements of a system for providing clock and data signaling according to an embodiment.

FIG. 1 illustrates elements of a system 100 for exchanging combined data and clock signals according to an embodiment. System 100 may include a TMDS source 110 and a TMDS sink 150 coupled to one another by a plurality of signal lines. By way of illustration and not limitation, a connector 135 of TMDS source 110 and a connector 175 of TMDS sink 150 may be coupled to one another by a cable and/or other interconnect media which includes a pair 140 of signal lines and a pair 145 of signal lines.

As used herein, the term "sink" refers to the characteristic of a device receiving communications from some other device. Correspondingly, the term "source" refers to the characteristic of a device providing communications to some other (sink) device. In an embodiment, TMDS source 110 includes functionality of one or more conventional data source devices. By way of illustration and not limitation, TMDS source 110 may include functionality including, but not limited to, that of a personal computer (e.g. tablet, notebook, laptop, desktop and/or the like), camcorder, smart phone, video game console, television, monitor, display, set-top box, home theater receiver and/or the like. In an embodiment, TMDS source 110 is a component—e.g. a hard disk drive, a solid state drive, a bus, an input port, etc.—of such a source device. Alternatively or in addition, TMDS sink 150 may include functionality of one or more conventional sink devices including, but not limited to, a television, monitor, display and/or the like. In an embodiment, TMDS source 110 is further capable of variously providing functionality of one or more conventional sink devices and/or TMDS sink 150 is further capable of variously providing functionality of one or more conventional source devices.

In an embodiment, one or both of connectors 135, 175 are compatible with connector requirements of a communication specification which specifies, for example, that particular pairs of contacts (e.g. pins, pads, balls, sockets and/or the like) of a connector, or respective signal lines corresponding to such contacts, are each for respective differential signal pairs. For example, one or both of connectors 135, 175 may be compatible with an HDMI standard such as the HDMI 1.4 standard released May 28, 2009 by HDMI Licensing, LLC of Sunnyvale, Calif., a Digital Visual Interface (DVI) standard such as the DVI 1.0 standard released Apr. 2, 1999 by the Digital Display Working Group of Vancouver, Wash., and/or any of a variety of additional or alternative specifications.

System 100 may provide functionality for multiple pairs of signal to be exchanged between TMDS source 110 and TMDS sink 150, wherein each of the multiple signal pairs is to communicate respective data and wherein each of the multiple signal pairs is further based on a different respective clock signal of a differential clock signal pair. For example, TMDS source 110 may include a transmitter 120—e.g. including hardware, firmware and/or executing software—to determine data 112 and a clock signal CLK 114 and, based on data 112 and CLK 114, to variously transmit respective signals via signal line pairs 140, 145. In an embodiment, transmitter 120 receives some or all of data 112 and CLK 114 from one or more other components of TMDS source 110. Alternatively or in addition, transmitter 120 may generate some or all of data 112 and/or CLK 114 based on information provided, for example, from one or more other resources of TMDS source 110.

In an embodiment, data 112 includes first data to be represented in communications via signal line pair 140 and second data to be represented in communications via signal line pair 145. By way of illustration and not limitation, data 112 may include multiple signals (not shown) provided to transmitter 120 in parallel with one another, the multiple signals including one or more differential data signal pairs. Alternatively or in addition, data 112 may include one or more single-ended data signals, where transmitter 120 includes logic to convert such one or more single-ended data signals each into a respective differential data signal pair—e.g. according to any of a variety of conventional techniques. Similarly, CLK 114 may include a differential clock signal pair comprising two clock signals (not shown) having respective logic states, and logic state transitions, which are reciprocal to one another. Alternatively, CLK 114 may consist of a single-ended data signal which transmitter 120 receives and converts into such a differential clock signal pair. Certain embodiments are not limited with respect to the particular source from which, or means by which, transmitter 120 receives or otherwise determines differential data signal pairs (or a differential clock signal pair) to be variously represented in communications transmitted via connector 135.

Based on data 112 and CLK 114, transmitter 120 may generate a first signal pair which is transmitted via first contacts of connector 135, and via signal line pair 140, to connector 175 of TMDS sink 150. Alternatively or in addition, transmitter 120 may generate a second signal pair based on data 112 and CLK 114, which is transmitted to connector 175 via second contacts of connector 135 and via signal line pair 145. The first signal pair communicated via signal line pair 140 may be based on a first differential data signal pair of data 112—e.g. where the first signal pair is further based on a first clock signal of a differential clock signal pair for CLK 114. The second signal pair communicated via signal line pair 145 may be based on a second differential data signal pair of data 112—e.g. where the second signal pair is further based on a second clock signal of the differential clock signal pair for CLK 114.

In an embodiment, TMDS sink 150 comprises a receiver 160—e.g. including hardware, firmware and/or executing software—to receive the first signal pair and the second signal pair via signal line pairs 140, 145, respectively. Receiver 160 may include decoder logic 162 to decode the first signal pair and decoder logic 164 to decode the second signal pair. In an embodiment, decoding by decoder logic 162 results in generation of a first differential data signal pair of data 152, and decoding by decoder logic 164 results in generation of a second differential data signal pair of data 152. Such differential data signal pairs may be equal to corresponding differential data signal pairs of data 112. In an embodiment, the decoding by decoder logic 162 and decoder 164 further results in generation of clock signal CLK 154—e.g. a single-ended clock signal or, alternatively, a clock signal of a differential clock signal pair. CLK 154 may include some or all of the features of CLK 114, for example.

One or more aspects of operation by transmitter 120 may be in response to, or otherwise based on, control logic 130 of TMDS source 110. Similarly, one or more aspects of operation by receiver 160 may be in response to, or otherwise based on, control logic 170 of TMDS sink 150. For example, control logic 130 and/or control logic 170 may engage in communications to determine a capacity of transmitter 120 to provide combined data and control signals and/or a capacity of receiver 160 to receive and process such combined data and control signals. Any of a variety of conventional discovery communication protocols may be adapted to further provide for such communications, according to different embodiments.

Figure 2:
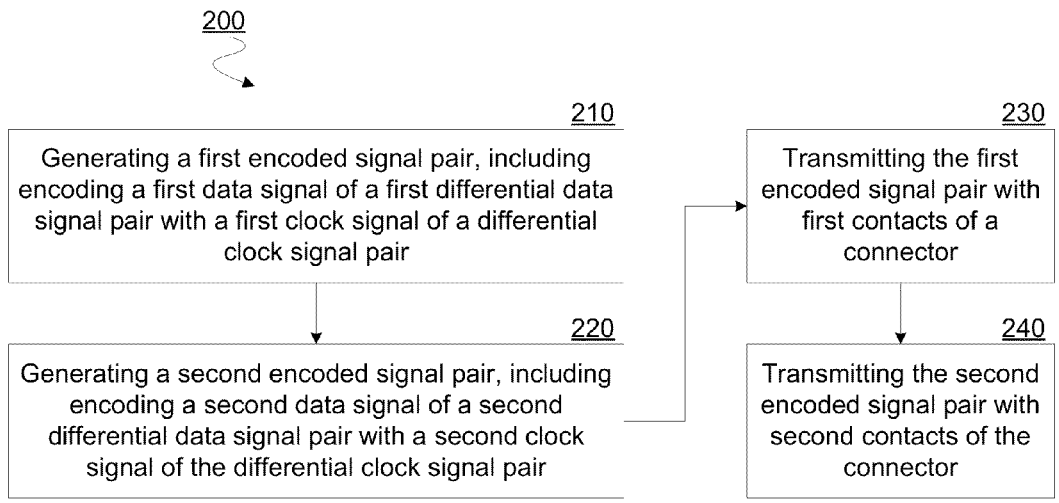
FIG. 2 is a flow diagram illustrating elements of a method for transmitting clock and data communications according to an embodiment.

FIG. 2 illustrates elements of a method 200 for providing combined data and clock signals according to an embodiment. Method 200 may be performed by a device having some or all of the features of TMDS source 110, for example. In an embodiment, method 200 is performed by transmitter 120, or logic providing corresponding functionality.

Method 200 may include, at 210, generating a first encoded signal pair, including encoding a first data signal of a first differential data signal pair with a first clock signal of a differential clock signal pair. Encoding the first data signal with the first clock signal may include, for example, providing the first data signal and the first clock signal each as an input to an adder, a modulator or other signal processing logic. In response, the signal processing logic may generate a first encoded signal of the first encoded signal pair, the first encoded signal representing a combination of the first data signal and the first clock signal. The first encoded signal may be equal to a sum of the first data signal and the first clock signal, although certain embodiments are not limited in this regard.

Alternatively or in addition, generating the first encoded signal pair at 210 may further comprise encoding another data signal of the first differential data signal pair with the first clock signal. By way of illustration and not limitation, the other data signal of the first differential data signal pair and the first clock signal may each be similarly input to an adder, a modulator or other signal processing logic which, in response, generates a second encoded signal of the first encoded signal pair. Such a second encoded signal may be equal to a sum of the other data signal and the first clock signal, for example.

In an embodiment, method 200 further comprises, at 220, generating a second encoded signal pair, including encoding a second data signal of a second differential data signal pair with a second clock signal of the differential clock signal pair. Generating the second encoded signal pair at 220 may be similar to the generating of the first encoded signal pair at 210 in one or more respects. For example, encoding the second data signal with the second clock signal may include, for example, providing the second data signal and the second clock signal each as an input to an adder, a modulator or other signal processing logic. In response, the signal processing logic may generate an encoded signal of the second encoded signal pair, the encoded signal representing a combination of the second data signal and the second clock signal. The encoded signal may be equal to a sum of the second data signal and the second clock signal, although certain embodiments are not limited in this regard.

Of the two signals of the differential clock signal pair, generating the first encoded signal pair may, in an embodiment, include encoding the first differential data signal pair with only the first clock signal—i.e. and not also with the second clock signal. Similarly, the two signals of the differential clock signal pair, generating the second encoded signal pair may, in an embodiment, include encoding the second differential data signal pair with only the second clock signal—i.e. and not also with the first clock signal.

Method 200 may further include, at 230, transmitting the first encoded signal pair with first contacts of a connector and, at 240, transmitting the second encoded signal pair with second contacts of the connector. In an embodiment, the connector is compatible with a communication specification such as an HDMI specification, a DVI specification and/or the like. The first contacts of the connector may correspond to a pair of connector contacts (or a pair of signal lines) which, according to such a communication specification, are both dedicated to the same differential signal pair—e.g. a differential data signal pair or, alternatively, a differential clock signal pair. By contrast, the second contacts of the connector may correspond to a pair of connector contacts (or a pair of signal lines) which, according to the communication specification, are both dedicated to another differential signal pair.

Figure 3:
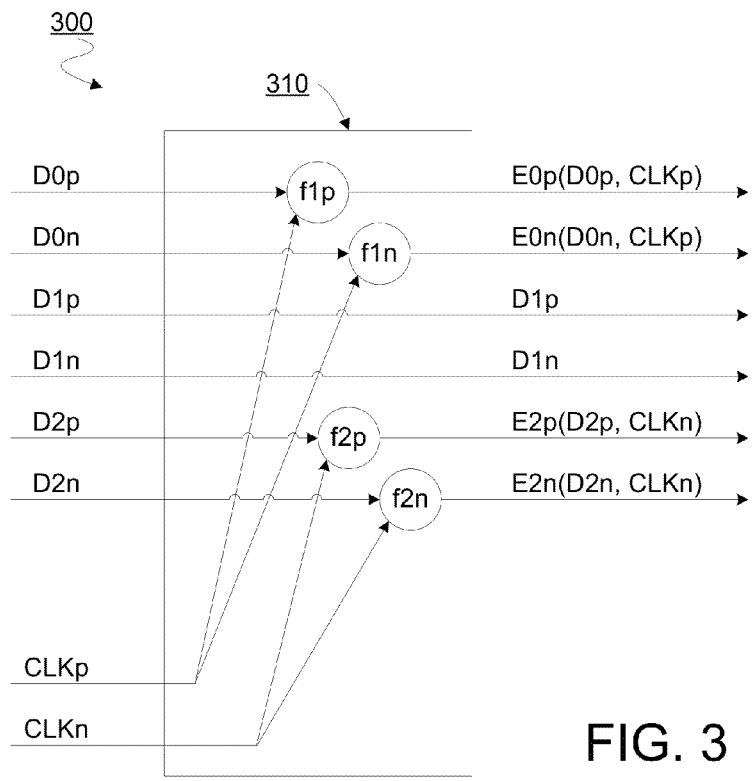
FIG. 3 is a block diagram illustrating elements of a transmitter for providing clock and data communications according to an embodiment.

FIG. 3 illustrates elements of a device 300 for transmitting combined data and clock signals according to an embodiment. Device 300 may include some or all of the features of TMDS source 110, in various embodiments. For example, device 300 may be, include or otherwise provide functionality of transmitter 120.

In an embodiment, device 300 includes encoder circuitry 310 to receive or otherwise determine two differential data signal pairs and a differential clock signal pair. Encoder circuitry 310 may provide some or all of the functionality of encoder logic 122 and/or encoder logic 124, for example. By way of illustration and not limitation, encoder logic 310 may receive a first differential data signal pair comprising data signals D0p, D0n, a second differential data signal pair comprising data signals D2p, D2n and a differential clock signal pair comprising clock signals CLKp, CLKn. In an embodiment, one or more additional differential signal pairs—e.g. including a differential data signal pair comprising data signals D1p, D1n—may be passed through, or bypass, encoder circuitry 310. Alternatively, such one or more additional differential signal pairs may be processed by encoder logic 310—e.g. according to techniques discussed herein.

Encoder circuitry 310 may operate to generate an encoded signal pair including encoded signals E0p, E0n. By way of illustration and not limitation, encoder circuitry 310 may include functional logic f1p and circuitry to provide D0p and CLKp as inputs for f1p. In an embodiment, f1p performs one or more encoding operations to generate E0p as a function of D0p and CLKp. Alternatively or in addition, encoder circuitry 310 may include functional logic f1n and circuitry to provide D0n and CLKp as inputs for f1n, where f1n performs one or more encoding operations to generate E0n as a function of D0n and CLKp. In an illustrative embodiment, f1p and f1n generate E0p and E1n at time t according to the following:

$$E0p(t)=D0p(t)+CLKp(t) \quad (1)$$

$$E0n(t)=D0n(t)+CLKp(t) \quad (2)$$

However, any of a variety of additional or alternative encoding operations may be performed, according to different embodiments, for generating E0p based on D0p and CLKp and/or for generating E0n based on D0n and CLKp.

Encoder circuitry 310 may further generate another encoded signal pair including encoded signals E2p, E2n. By way of illustration and not limitation, encoder circuitry 310 may include functional logic f2p and circuitry to provide D2p and CLKn as inputs for f2p. In an embodiment, f2p performs one or more encoding operations to generate E2p as a function of D2p and CLKn. Alternatively or in addition, encoder circuitry 310 may include functional logic f2n and circuitry to provide D2n and CLKn as inputs for f2n, where f2n performs one or more encoding operations to generate E2n as a function of D2n and CLKn. In an illustrative embodiment, f2p and f2n generate E2p and E1n at time t according to the following:

$$E2p(t)=D2p(t)+CLKn(t) \quad (3)$$

$$E2n(t)=D2n(t)+CLKn(t) \quad (4)$$

However, any of a variety of additional or alternative encoding operations may be performed, according to different embodiments, for generating E2p based on D2p and CLKn and/or for generating E2n based on D2n and CLKn.

Figure 4:
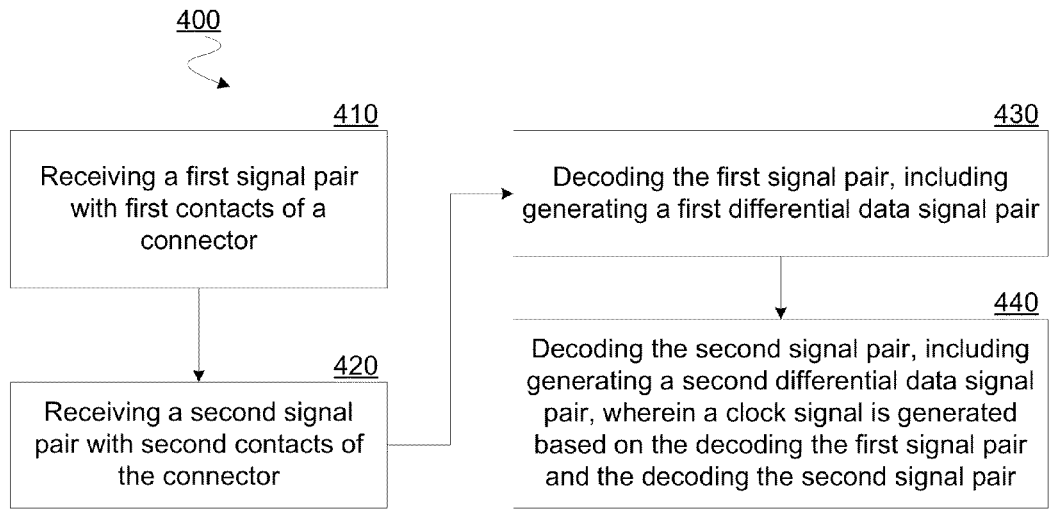
FIG. 4 is a flow diagram illustrating elements of a method for processing clock and data communications according to an embodiment.

FIG. 4 illustrates elements of a method 400 for processing combined data and clock signals according to an embodiment. Method 400 may be performed by a device having some or all of the features of TMDS sink 150, for example. In an embodiment, method 400 is performed by a device which is, includes or otherwise provides functionality of transmitter 120.

Method 400 may include, at 410, receiving a first signal pair with first contacts of a connector and receiving, at 420, a second signal pair with second contacts of the connector. In an embodiment, the first signal pair and the second signal pair include some or all of the respective features of the first encoded signal pair and the second encoded signal pair discussed with reference to method 200. By way of illustration and not limitation, the first signal pair may include signals E0p, E0n and/or the second signal pair may include signals E2p, E2n. In an embodiment, the connector is compatible with a communication specification such as an HDMI specification, a DVI specification and/or the like. The first contacts and second contacts may, for example, include some of all of the respective features of the first contacts and second contacts discussed with respect to method 200.

In an embodiment, method 400 further includes, at 430, decoding the first signal pair, including generating a first differential data signal pair. For example, decoding the first signal pair may include calculating, based on the first signal pair, a first clock signal of a differential clock signal pair. In an embodiment, the calculated first clock signal may be used to variously identify respective differential data signal components in each of the signals of the first signal pair. By way of illustration and not limitation, the calculated first clock signal may be variously subtracted from each signal of the first signal pair.

Method 400 may further include, at 440, decoding the second signal pair, including generating a second differential data signal pair, wherein a clock signal is generated based on the decoding the first signal pair and the decoding the second signal pair. For example, decoding the second signal pair may include calculating, based on the second signal pair, a second clock signal of the differential clock signal pair. In an embodiment, the calculated second clock signal may be used to variously identify respective differential data signal components in each of the signals of the second signal pair. By way of illustration and not limitation, the calculated second clock signal may be variously subtracted from each signal of the second signal pair.

Figure 5:
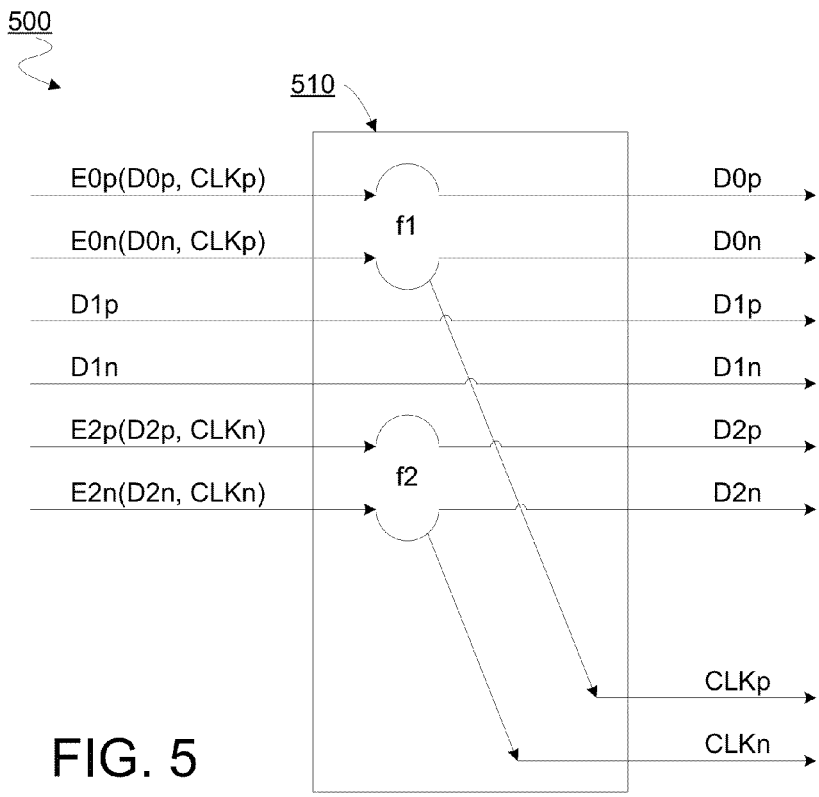
FIG. 5 is a block diagram illustrating elements of a receiver for processing clock and data communications according to an embodiment.

FIG. 5 illustrates elements of a device 500 for processing combined data and clock signals according to an embodiment. Device 500 may include some or all of the features of TMDS sink 150, for example. In an embodiment, device 500 is, includes or otherwise provides functionality of, receiver 160.

Device 500 includes decoder circuitry 510 to receive two signal pairs which each represent a respective combination of data and clock signaling. Decoder circuitry 510 may provide some or all of the functionality of decoder logic 162 and/or decoder logic 164, for example. By way of illustration and not limitation, decoder circuitry 510 may receive a first signal pair comprising signals E0p, E0n, a second signal pair comprising signals E2p, E2n. In an embodiment, the first signal pair and the second signal pair may be, respectively, the first encoded signal pair and the second encoded signal pair discussed with reference to device 300.

One or more additional signal pairs—e.g. including a differential data signal pair comprising data signals D1p, D1n—may be passed through, or bypass, decoder circuitry 510. Alternatively, such one or more additional signal pairs may be processed by decoder circuitry 510—e.g. according to techniques discussed herein.

Decoder circuitry 510 may operate to generate a data signals and at least one clock signal based on the received first signal pair and the second signal pair. By way of illustration and not limitation, decoder circuitry 510 may include functional logic f1 and circuitry to provide E0p and E0n as inputs for f1. In an embodiment, E0p represents a function of a first data signal D0p of a first differential signal pair and a clock signal CLKp of a differential clock signal pair. Similarly, E0n may represent a function of a second data signal D0n of the first differential signal pair and the clock signal CLKp. In such a scenario, f1 may perform one or more decoding operations to generate the first differential data signal pair D0p, D0n based on E0p and E0n. In an embodiment, decoding operations of f1 may facilitate generation of CLKp and/or a single-ended clock signal corresponding to the differential clock signal pair.

Decoding operations performed by f1 may functionally operate as an inverse of encoding operations performed by f1p and f1n of encoder circuitry 310, for example. In an illustrative embodiment, f1 calculates CLKp at time t as an average of E0p and E0n according to the following:

$$CLKp(t)=[E0p(t)+E0n(t)]/2 \quad (5)$$

Based on the calculated CLKp(t), f1 may further calculate D0p and D0n at time t—e.g. according to the following:

$$D0p(t)=E0p(t)-CLKp(t) \quad (6)$$

$$D0n(t)=E0n(t)-CLKp(t) \quad (7)$$

Any of a variety of additional or alternative decoding operations may be performed, according to different embodiments, for generating D0p, D0n and CLKp based on E0p and E0n.

Additionally or alternatively, decoder circuitry 510 may include functional logic f2 and circuitry to provide E2p and E2n as inputs for f2. In an embodiment, E2p represents a function of a first data signal D2p of a second differential signal pair and another clock signal CLKn of the differential clock signal pair which includes CLKp. Similarly, E2n may represent a function of a second data signal D2n of the second differential signal pair and the clock signal CLKn. In such a scenario, f2 may perform one or more decoding operations to generate the second differential data signal pair D2p, D2n based on E2p and E2n. In an embodiment, decoding operations of f2 may facilitate generation of CLKn and/or a single-ended clock signal corresponding to the differential clock signal pair.

Decoding operations performed by f2 may functionally operate as an inverse of encoding operations performed by f2p and f2n of encoder circuitry 310, for example. In an illustrative embodiment, f2 calculates CLKn at time t as an average of E2p and E2n according to the following:

$$CLKn(t)=[E2p(t)+E2n(t)]/2 \quad (8)$$

Based on the calculated CLKn(t), f2 may further calculate D2p and D2n at time t—e.g. according to the following:

$$D2p(t)=E2p(t)-CLKn(t) \quad (9)$$

$$D2n(t)=E2n(t)-CLKn(t) \quad (10)$$

Any of a variety of additional or alternative decoding operations may be performed, according to different embodiments, for generating D2p, D2n and CLKn based on E2p and E2n. For example, functionality of decoder circuitry 510 may, in another embodiment, calculate a single ended clock signal CLK directly from E0p, E0n, E2p, E2n—i.e. without first calculating CLKp and CLKn. Such a single-ended clock signal CLK may be calculated according to the following:

$$CLK=[E0p(t)+E0n(t)-E2p(t)-E2n(t)]/4 \quad (11)$$

Figure 6:
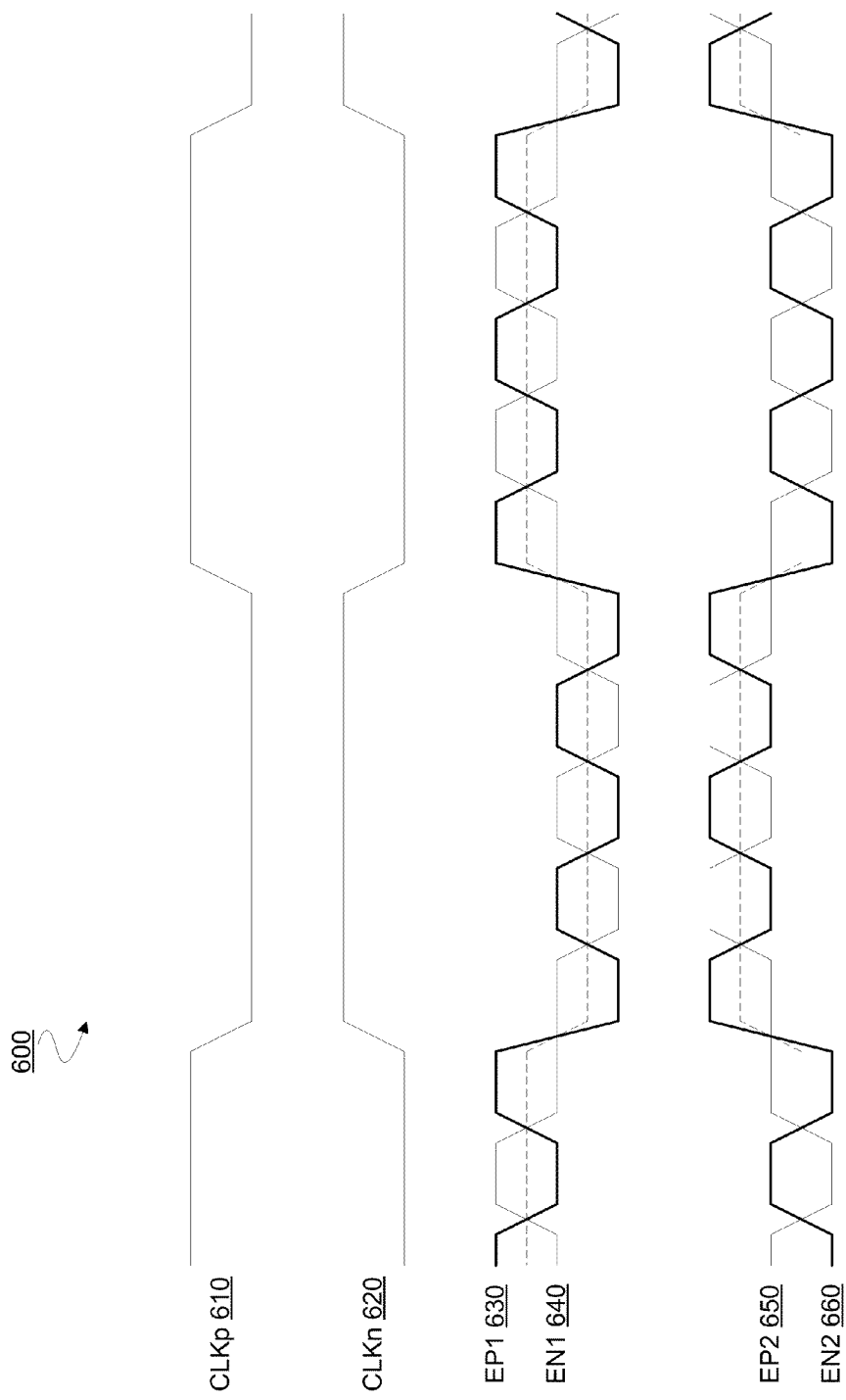
FIG. 6 is a timing diagram illustrating elements of clock and data communications exchanged according to an embodiment.

FIG. 6 is timing diagram 600 illustrating features of various waveforms that may be generated and/or decoded according to various embodiments. The signaling techniques and devices described herein are applicable to any differential pair data transfer mechanism, for example, a HDMI-compatible cable, a DVI compatible cable, etc. which allows for clock signals of a differential clock signal pair to be represented in communications via different respective pairs of signal lines, where each such pair of signal lines is to further support communication of different respective data communications.

In timing diagram 600, CLKp 610 and CLKn 620 are clock signals of the same differential clock signal pair. EP1 630 is an encoded signal of a first signal pair which is generated as a function of CLKp 610 and a first data signal of a first differential data signal pair. EN1 640 is another encoded signal of the first signal pair which is generated as a function of CLKp 610 and the other data signal of the first differential data signal pair. To illustrate certain features of various embodiments, EP1 630 and EN1 640 are represented as respective sums of CLKp 610 and a corresponding data signal which alternates periodically between 0 and 1. However, any of a variety of other encoding techniques and/or differential data signals may be used to generate EP1 630 and EN1 640 based on CLKp 610.

In timing diagram 600, EP2 650 is an encoded signal of a second signal pair which is generated as a function of CLKn 620 and a first data signal of a second differential data signal pair. EN2 660 is another encoded signal of the second signal pair which is generated as a function of CLKn 620 and the other data signal of the second differential data signal pair. To illustrate certain features of various embodiments, EP2 650 and EN2 660 are represented as respective sums of CLKn 620 and a corresponding data signal which alternates periodically between 0 and 1. However, any of a variety of other encoding techniques and/or differential data signals may be used to generate EP2 650 and EN2 660 based on CLKn 620.

Figure 7:
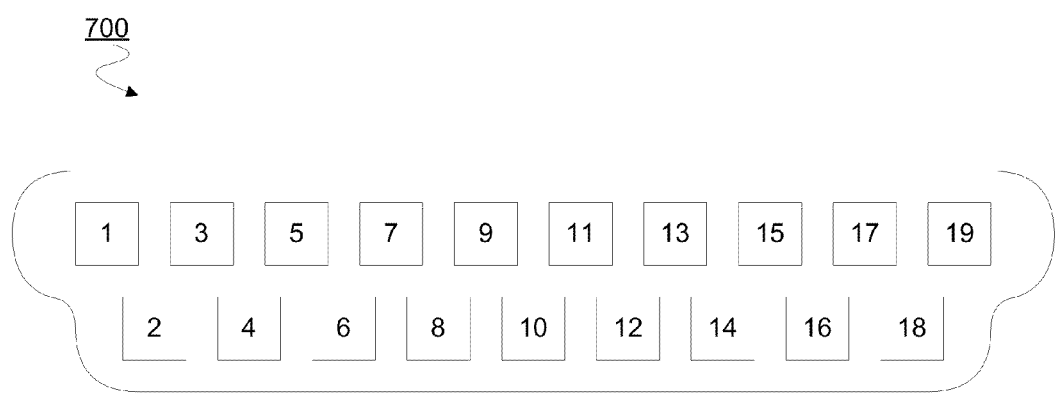
FIG. 7 is a layout diagram illustrating elements of a connector for exchanging clock and data communications according to an embodiment.

FIG. 7 illustrates select elements of a connector 700 for exchanging combined data and clock signals according to an embodiment. Connector 700 may include some or all of the features of connector 135 and/or connector 175, for example. The illustrative connector 700 is a 19-channel (e.g. 19-pin) connector which is compatible with an HDMI interface standard, although certain embodiments are not limited in this regard. Connector 700 may support signal exchanges by any of a variety of other types of interconnect hardware—e.g. a connector including more, fewer, or alternative channels to those shown in FIG. 7—where communication via such a connector is consistent with techniques discussed herein.

The illustrative connector 700 includes interconnect hardware to support transition-minimized differential signaling (TMDS) in HDMI communication. More particularly, the respective functions of the channels in connector 700 may be assigned according to HDMI 1.4 or some other HDMI interface standard—e.g. as follows:
Channel 1 TMDS Data2+
Channel 2 TMDS Data2 Shield Channel 3 TMDS Data2−
Channel 4 TMDS Data1+
Channel 5 TMDS Data1 Shield
Channel 6 TMDS Data1−
Channel 7 TMDS Data0+
Channel 8 TMDS Data0 Shield
Channel 9 TMDS Data0−
Channel 10 TMDS Clock+
Channel 11 TMDS Clock Shield
Channel 12 TMDS Clock−
Channel 13 Consumer Electronics Control (CEC)
Channel 14 Utility and/or HDMI Ethernet Channel (HEC) Data+
Channel 15 System Clock Line (SCL)—I²C Serial Clock for Display Data Channel (DDC)
Channel 16 System Data (SDA)—I²C Serial Data Line for DDC
Channel 17 DDC/CEC/HEC Ground
Channel 18 +5 V Power
Channel 19 Hot Plug Detect (HPD) and/or HEC Data−

Connector 700 includes pairs of channels (and corresponding pairs of contacts), some or all of which may, according to different embodiments, be used for exchanging different respective encoded signal pairs variously representing respective combinations of data and clock signaling. For example, the pair of channels 1 and 3, the pair of channels 4 and 6 and/or the pair of channels 7 and 9 may be used each for transmitting or receiving a respective encoded signal pair.

Figure 8A:
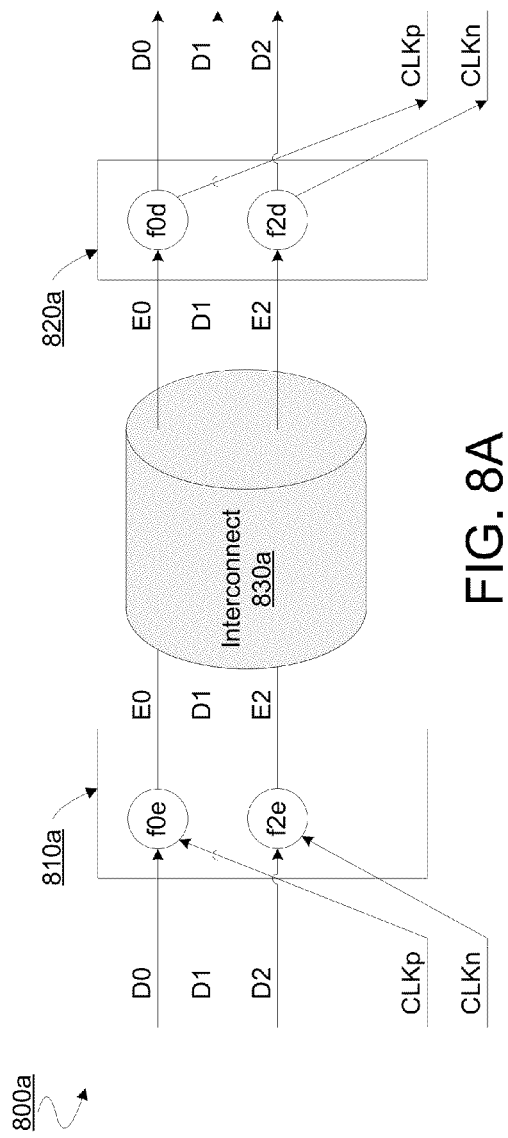
FIG. 8A, 8B are block diagrams illustrating elements of systems for variously providing clock and data signaling according to respective embodiments.

FIG. 8A illustrates elements of a system 800a for exchanging combined data and clock signals according to an embodiment. System 800a may include some or all of the features of system 100, in various embodiments. For example, system 800a may include, or otherwise provide respective functionality of, transmitter 120 and/or receiver 160.

In an embodiment, system 800a includes encoder circuitry 810a to receive two differential data signal pairs—e.g. represented by the illustrative differential data signal pairs D0 and D2—and a differential clock signal pair including clock signals CLKp, CLKn. Encoder circuitry 810a may provide some or all of the functionality of encoder circuitry 310, for example. By way of illustration and not limitation, encoder circuitry 810a may include functional logic f0e to encode one or both data signals of D0 with CLKp, and functional logic f2e to encode one or both data signals of D2 with CLKn. Encoding operations of f0e and f2e may generate, respectively, a first encoded signal pair E0 and a second encoded signal pair E2. Such encoding operations by f0e and/or f2e may implement some or all of method 200, for example. One or more other differential data signal pairs—e.g. including the illustrative differential data signal pair D1—may variously pass through, bypass or be processed by encoder circuitry 810a, although certain embodiments are not limited in this regard.

System 800a may further include decoder circuitry 820a to receive E0 and E2 via interconnect 830a. Decoder circuitry 820a may provide some or all of the functionality of decoder circuitry 510, for example. By way of illustration and not limitation, decoder circuitry 820a may include functional logic f0d to decode one or both signals of signal pair E0, and functional logic f2d to decode one or both signals of signal pair E2. Decoding operations of f0d and f2d may generate, respectively, first differential data signal pair D0 and second encoded differential data signal pair D2. Such encoding operations by f0d and/or f2d may implement some or all of method 400. For example, decode operations of f0d and f2d may generate one or both clock signals CLKp, CLKn of a differential clock signal pair and/or a single-ended clock signal corresponding to such a differential clock signal pair.

Figure 8B:
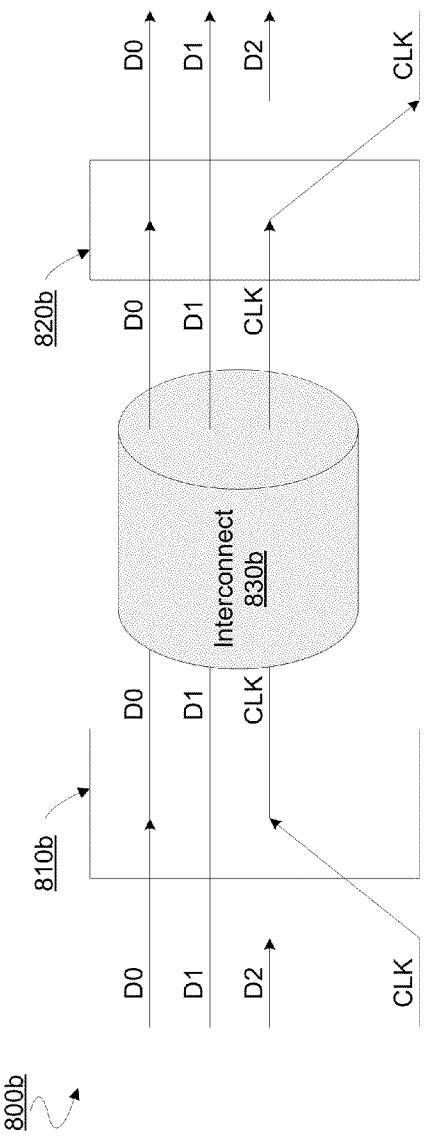

FIG. 8B illustrates elements of a system 800b for exchanging data signals and clock signals according to an embodiment. System may include some or all of the features of system 800a. For example, system 800b may include encoder circuitry 810b, decoder circuitry 820b and interconnect 830b corresponding functionally to encoder circuitry 810a, decoder circuitry 820a and interconnect 830a, respectively. System 800b may represent a different mode of operation to that shown for system 800a in FIG. 8A. In an embodiment, control logic included in or coupled to encoder circuitry 810b—e.g. logic providing functionality of control logic 130—may change one or more switch elements (not shown) of encoder circuitry 810b to provide a differential clock signal CLK to a signal line pair which, in system 800a, is to communicate encoded signal pair E2. Such a configuration may be for one or both of CLK and differential data signal pair D0 to bypass encoding logic (not shown) of encoder circuitry 810a such as f0e and/or f2e.

Alternatively or in addition, control logic included in or coupled to decoder circuitry 820b—e.g. logic providing functionality of control logic 170—may change one or more switch elements (not shown) of decoder circuitry 820b for receipt of differential clock signal CLK from interconnect 830b. Such a configuration of decoder circuitry 820b may be for one or both of CLK and D0 to bypass decoding logic (not shown) of decoder circuitry 810a such as f0d and/or f2d.

Figure 9:
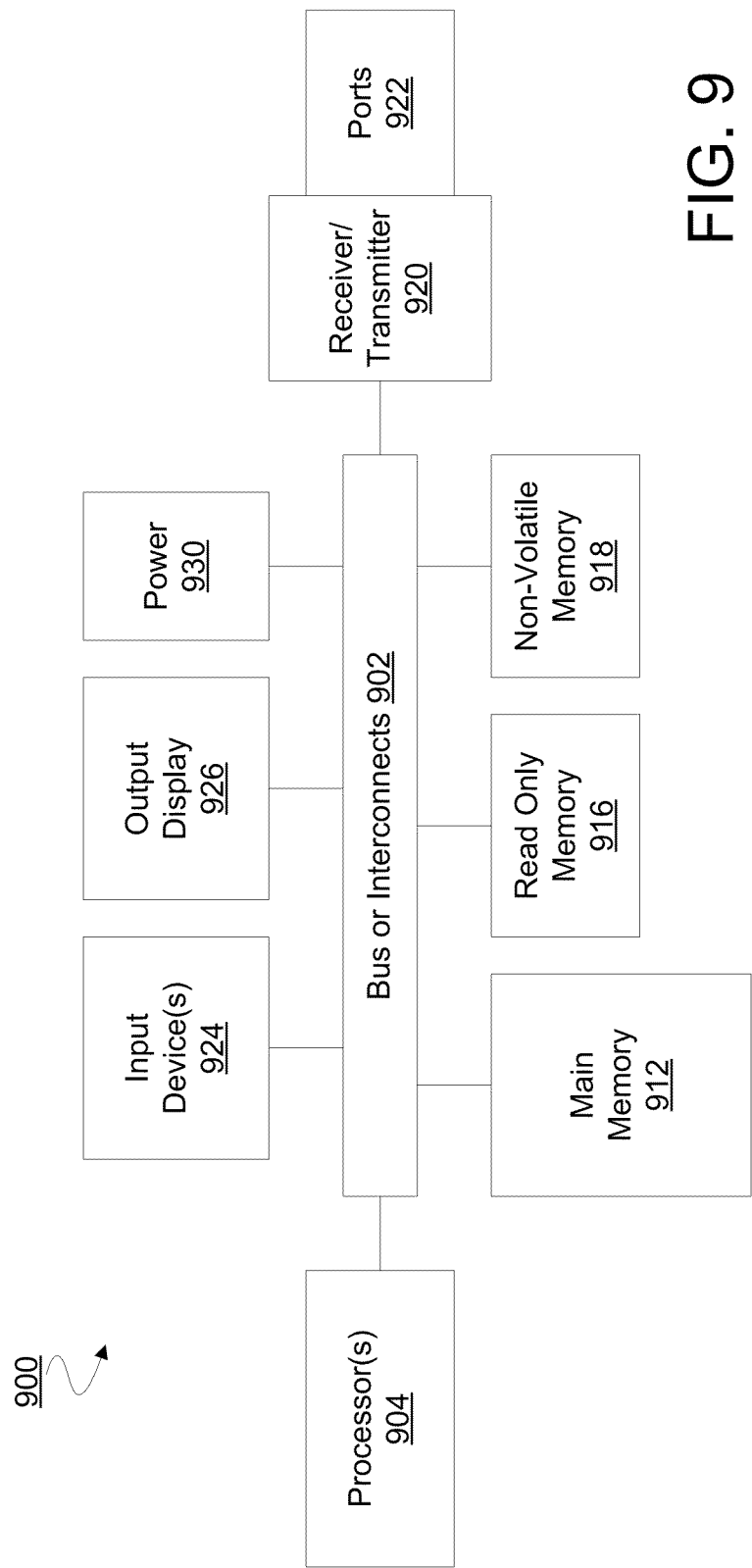
FIG. 9 is a block diagram illustrating elements of a computer system for exchanging clock and data communications according to an embodiment.

FIG. 9 is an illustration of an apparatus or system including logic to communicate combined data and clock signals. In this illustration, certain standard and well-known components that are not germane to the present description are not shown. In some embodiments, the apparatus or system 900 (referred to herein generally as an apparatus) comprises a bus or interconnects 902 or other communication means for transmission of data. The apparatus 900 may include a processing means, such as one or more processors 904 coupled with the interconnect 902 for processing information. The processors 904 may comprise one or more physical processors and one or more logical processors. The bus or interconnect 902 is illustrated as a single interconnect for simplicity, but may represent multiple different interconnects or buses and the component connections to such interconnects may vary. The interconnect 902 shown in FIG. 9 is an abstraction that represents any one or more separate physical buses, point to point connections, or both connected by appropriate bridges, adapters, or controllers.

In some embodiments, the apparatus 900 further comprises a random access memory (RAM) or other dynamic storage device or element as a main memory 912 for storing information and instructions to be executed by the processors 904. RAM memory may include dynamic random access memory (DRAM). In some embodiments, memory of the apparatus may further include certain registers or other special purpose memory.

The apparatus 900 may include a read only memory (ROM) 916 or other static storage device for storing static information and instructions for the processors 904. The apparatus 900 may include one or more non volatile memory elements 918 for the storage of certain elements, including, for example, flash memory, hard disk drive, or solid-state drive.

One or more transmitters or receivers 920 may also be coupled to the interconnect 902. In some embodiments, the receivers or transmitters 920 may be coupled to one or more ports 922, where the ports may include, for example, one or more HDMI™ (High-Definition Multimedia Interface) ports, one or more MHL™ (Mobile High-Definition Link) ports, one or more DVI ports and/or the like. The one or more transmitters or receivers 920 may include logic to generate a first encoded signal pair, including encoding a first data signal of a first differential data signal pair with a first clock signal of a differential clock signal pair, and to generate a second encoded signal pair, including encoding a second data signal of a second differential data signal pair with a second clock signal of the differential clock signal pair. In an embodiment, one or more transmitters or receivers 920 is to transmit the first encoded signal pair with first contacts of a connector, and is further to transmit the second encoded signal pair with second contacts of the same connector. Alternatively or in addition, the one or more transmitters or receivers 920 may include logic to receive and process such a first encoded signal pair and second encoded signal pair. For example, the one or more transmitters or receivers 920 may include logic to decode a first signal pair received via ports 922, including generating a first differential data signal pair, and to decode the second signal pair received via ports 922, including generating a second differential data signal pair. In an embodiment, a clock signal is generated based on such decoding of the first signal pair and decoding of the second signal pair.

In some embodiments, the apparatus 900 includes one or more input devices 924, where the input devices include one or more of a keyboard, mouse, touch pad, voice command recognition, gesture recognition, or other device for providing an input to a computing system. The apparatus 900 may also be coupled via the interconnect 902 to an output device 926. In some embodiments, the display 926 may include a liquid crystal display (LCD) or any other display technology, for displaying information or content to a user. In some environments, the display 926 may include a touch screen that is also utilized as at least a part of an input device. In some environments, the display 926 may be or may include an audio device, such as a speaker for providing audio information. The apparatus 900 may also comprise a power device or apparatus 930, which may comprise a power supply, a battery, a solar cell, a fuel cell, or other system or device for providing or generating power. The power provided by the power device or system 930 may be distributed as required to elements of the apparatus 900.

Techniques and architectures for communicating combined data and clock signals are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
   a transmitter including:
      a first encoder circuitry to generate a first encoded signal pair, the first encoder circuitry to encode a first data signal of a first differential data signal pair with a first clock signal of a differential clock signal pair; and
      a second encoder circuitry to generate a second encoded signal pair, the second encoder circuitry to encode a second data signal of a second differential data signal pair with a second clock signal of the differential clock signal pair;

wherein the transmitter to transmit the first encoded signal pair with first contacts of a connector and to transmit the second encoded signal pair with second contacts of the connector.

2. The apparatus of claim 1, wherein the first encoder circuitry encodes the first differential data signal pair with only the first clock signal.

3. The apparatus of claim 1, wherein the first differential data signal pair includes a third data signal, and wherein the first encoder circuitry encodes the third data signal with the first clock signal.

4. The apparatus of claim 1, wherein the first encoder circuitry generates the first encoded signal pair by generating a sum of the first data signal and the first clock signal.

5. The apparatus of claim 1, wherein the connector is compatible with a communication specification, and wherein the first contacts correspond to contacts for a differential data signal pair according to the communication specification.

6. The apparatus of claim 1, further comprising switch logic to provide the first clock signal to the first encoder circuitry.

7. A method comprising:
generating a first encoded signal pair by encoding a first data signal of a first differential data signal pair with a first clock signal of a differential clock signal pair;
generating a second encoded signal pair by encoding a second data signal of a second differential data signal pair with a second clock signal of the differential clock signal pair;
transmitting the first encoded signal pair with first contacts of a connector; and
transmitting the second encoded signal pair with second contacts of the connector.

8. The method of claim 7, wherein generating the first encoded signal pair includes encoding the first differential data signal pair with only the first clock signal.

9. The method of claim 7, wherein the first differential data signal pair includes a third data signal, and wherein generating the first encoded signal pair includes encoding the third data signal with the first clock signal.

10. The method of claim 7, wherein encoding the first data signal with the first clock signal includes generating a sum of the first data signal and the first clock signal.

11. The method of claim 7, wherein the connector is compatible with a communication specification, and wherein the first contacts correspond to contacts for a differential data signal pair according to the communication specification.

12. The method of claim 7, further comprising operating switch logic to provide the first clock signal for generating the first encoded signal pair.

13. An apparatus comprising:
a receiver to receive a first signal pair with first contacts of a connector and to receive a second signal pair with second contacts of the connector, the receiver including:
a first decoder circuitry to decode the first signal pair, the first decoder circuitry to generate a first differential data signal pair;
a second decoder circuitry to decode the second signal pair, the second decoder circuitry to generate a second differential data signal pair, wherein a first clock signal of a differential clock signal is generated based on the decoding the first signal pair and a second clock signal of the differential clock signal is generated based on the decoding the second signal pair.

14. The apparatus of claim 13, wherein the first decoder circuitry generates the first differential data signal pair includes the first decoder circuitry to subtract the first clock signal from each signal of the first signal pair.

15. The apparatus of claim 14, wherein the first decoder circuitry generates the first clock signal by calculating an average of signals of the first signal pair.

16. The apparatus of claim 13, wherein the connector is compatible with a communication specification, and wherein the first contacts correspond to contacts for a differential data signal pair according to the communication specification.

17. A method comprising:
receiving a first signal pair with first contacts of a connector;
receiving a second signal pair with second contacts of the connector;
decoding the first signal pair by generating a first differential data signal pair;
decoding the second signal pair by generating a second differential data signal pair, wherein a first clock signal of a differential clock signal is generated based on the decoding the first signal pair and a second clock signal of the differential clock signal is generated based on the decoding the second signal pair.

18. The method of claim 17, wherein generating the first differential data signal pair includes subtracting the first clock signal from each signal of the first signal pair.

19. The method of claim 18, wherein generating the first clock signal includes calculating an average of signals of the first signal pair.

20. The method of claim 17, wherein the connector is compatible with a communication specification, and wherein the first contacts correspond to contacts for a differential data signal pair according to the communication specification.

* * * * *